(12) United States Patent
Xu

(10) Patent No.: US 9,549,357 B2
(45) Date of Patent: Jan. 17, 2017

(54) PROMOTING WIRELESS LOCAL AREA NETWORK (WLAN) ROAMING

(71) Applicant: Hangzhou H3C Technologies Co., Ltd., Hangzhou (CN)

(72) Inventor: Guoxiang Xu, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/650,464

(22) PCT Filed: Dec. 2, 2013

(86) PCT No.: PCT/CN2013/088300
§ 371 (c)(1),
(2) Date: Jun. 8, 2015

(87) PCT Pub. No.: WO2014/114142
PCT Pub. Date: Jul. 31, 2014

(65) Prior Publication Data
US 2015/0312830 A1 Oct. 29, 2015

(30) Foreign Application Priority Data
Jan. 22, 2013 (CN) .......................... 2013 1 0025276

(51) Int. Cl.
*H04W 4/00* (2009.01)
*H04W 36/30* (2009.01)
(Continued)

(52) U.S. Cl.
CPC .............. *H04W 36/30* (2013.01); *H04L 43/16* (2013.01); *H04W 8/22* (2013.01); *H04W 36/08* (2013.01); *H04W 36/38* (2013.01); *H04W 84/12* (2013.01)

(58) Field of Classification Search
CPC ........ H04W 36/08; H04W 36/30; H04L 43/16
See application file for complete search history.

(56) References Cited

U.S. PATENT DOCUMENTS 7,450,552 B2   11/2008  Behroozi
7,805,140 B2    9/2010  Friday et al.
(Continued)

FOREIGN PATENT DOCUMENTS

CN        101272308       9/2008
CN        101909339     12/2010
(Continued)

OTHER PUBLICATIONS

"Control Roaming Behavior on Your Cisco Wireless Network", May 16, 2011, http://ccie-or-null.net/2011/05/16/control-roaming-wlc/.

(Continued)

*Primary Examiner* — Maharishi Khirodhar
(74) *Attorney, Agent, or Firm* — Hewlett Packard Enterprise Patent Department

(57) ABSTRACT

The present disclosure describes promoting roaming of a wireless terminal in a wireless local area network (WLAN). The AP obtains signal quality and/or data transmission quality of the wireless terminal periodically, and determines whether the obtained signal quality and/or data transmission quality of the wireless terminal satisfies a predetermined threshold. Upon determining that the predetermined threshold is not satisfied, the AP proactively sends a probe response frame to the wireless terminal. The probe response frame notifies the wireless terminal of a wireless signal strength of the AP to promote roaming to a neighboring AP.

14 Claims, 6 Drawing Sheets

(51) Int. Cl.
*H04W 36/38* (2009.01)
*H04L 12/26* (2006.01)
*H04W 8/22* (2009.01)
*H04W 36/08* (2009.01)
*H04W 84/12* (2009.01)

(56) References Cited

U.S. PATENT DOCUMENTS

| | | | |
|---|---|---|---|
| 7,969,920 | B2 | 6/2011 | Wentink |
| 7,991,425 | B2 | 8/2011 | Su et al. |
| 8,089,939 | B1 | 1/2012 | Mater et al. |
| 2004/0039817 | A1 | 2/2004 | Lai |
| 2004/0264413 | A1* | 12/2004 | Kaidar ............ H04W 48/16 370/332 |
| 2005/0208950 | A1 | 9/2005 | Hasse |
| 2006/0025127 | A1 | 2/2006 | Cromer et al. |
| 2008/0020791 | A1* | 1/2008 | Ito ............ H04W 36/18 455/516 |
| 2008/0069068 | A1* | 3/2008 | Dean ............ H04W 48/14 370/342 |
| 2012/0014353 | A1 | 1/2012 | Marinier et al. |
| 2013/0235852 | A1* | 9/2013 | Segev ............ H04W 72/044 370/336 |
| 2013/0272269 | A1* | 10/2013 | Srivastava ............ H04W 36/30 370/332 |

FOREIGN PATENT DOCUMENTS

| | | |
|---|---|---|
| CN | 102843302 | 12/2012 |
| WO | WO-2009/095832 | 8/2009 |

OTHER PUBLICATIONS

International Search Report and Written Opinion dated Mar. 6, 2014 issued on PCT Patent Application No. PCT/CN2013/088300 dated Dec. 2, 2013, The State Intellectual Property Office, P.R. China.
Extended European Search Report, EP Application No. 13872319.2, Date: Sep. 22, 2016, pp. 1-12, EPO.

* cited by examiner

PROMOTING WIRELESS LOCAL AREA NETWORK (WLAN) ROAMING

CLAIM FOR PRIORITY

The present application is a national stage filing under 35 U.S.C 371 of PCT application number PCT/CN2013/088300, having an international filing date of Dec. 2, 2013, which claims priority to Chinese patent application number 201310025276.0 having a filing date of Jan. 22, 2013, the disclosures of which are hereby incorporated by reference in their entireties.

BACKGROUND

WLAN is a distributed system with a relatively loose network architecture compared to wireless systems such as Global System for Mobile Communications (GSM) and third generation (3G). For example, wireless access points (APs) and wireless terminals in a WLAN operate relatively independent from each other. After exchanging messages and establishing a link, an AP does not control actions of a wireless terminal except for disconnecting the link to the terminal. Due to the nature of how WLAN is implemented, a wireless terminal in a WLAN generally handles different network environments differently, and different manufacturers have different implementations.

BRIEF DESCRIPTION OF DRAWINGS

By way of examples, the present disclosure will be described with reference to the following drawings, in which.

DETAILED DESCRIPTION

For inter-AP roaming, different wireless terminals may behave quite differently, such as depending on their manufacturers and implementations etc. Some terminals may quickly switch to a new AP when approaching the new AP, but some terminals will not switch to a new AP until the signal strength of its current AP is very low. The latter causes the so-called "stickiness" phenomenon, in that "sticky" clients or wireless terminals tend to stay with the same AP although they could be better served by roaming to a neighbouring AP.

Further, due to different implementations of scanning operations of wireless terminals by different manufacturers, the rate at which APs are scanned may be fairly low when the wireless signal strength provided by a currently connected AP is relatively good. Thus, in the case of fast roaming, there may be an obvious lag between the actual wireless signal strength, and the strength previously sensed by the wireless terminal during scanning. The delayed detection of the change in signal strength further affects roaming.

According to examples of the present disclosure, an AP proactively sends a probe response frame to a wireless terminal to promote roaming. Referring to an example in FIG. 1, the following are performed by the AP in a WLAN.

At 110, the AP obtains signal quality and/or data transmission quality of the wireless terminal periodically.

At 120, the AP determines whether the obtained signal quality and/or data transmission quality of the wireless terminal satisfies a predetermined threshold.

At 130, upon determining that the predetermined threshold is not satisfied, the AP proactively sends a probe response frame to the wireless terminal. The probe response frame notifies the wireless terminal of a wireless signal strength provided by the AP. As such, the AP is able to promote roaming to a neighbouring AP.

A probe response frame is conventionally sent by a party providing WLAN services in response to a probe request frame sent by another party. According to examples of the present disclosure, the AP "proactively" sends probe response frame, i.e. the probe response frame is sent at the AP's own initiative to promote roaming instead of in response to a probe request frame from the wireless terminal.

The probe response frame is proactively sent to notify the wireless terminal of a wireless strength provided by the AP. This in turns influences wireless signal strength sensing at the wireless terminal and induces roaming to the neighbouring AP, for example if the current AP is unable to provide adequate services. For example, based on the probe response frame, the wireless terminal is able to sense the wireless signal strength at a quicker rate, instead of waiting for the next AP scanning operation. This promotes roaming and reduces the likelihood of the wireless terminal being "sticky" to the AP due to the frequency of scanning at the wireless terminal.

Examples will be described with reference to accompanying drawings.

Figure 2:
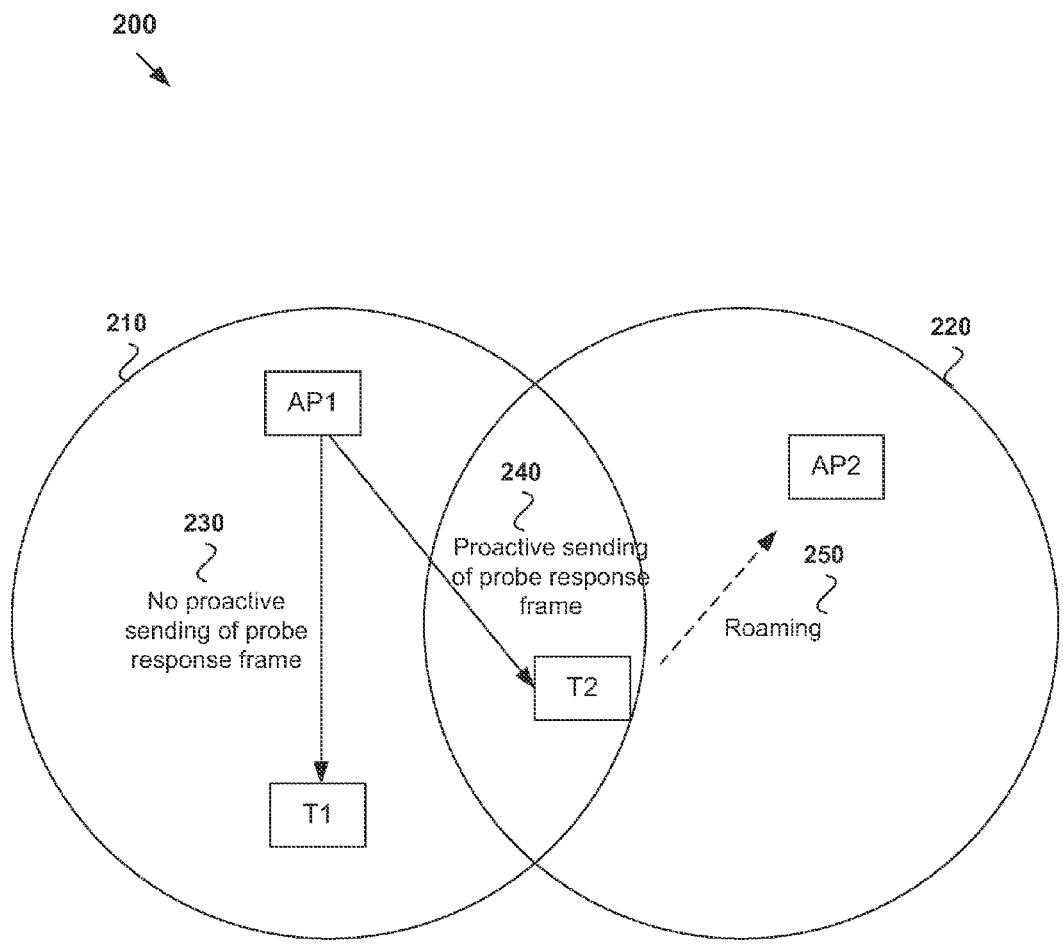
FIG. 2 is a schematic diagram of an example WLAN in which roaming of a wireless terminal is promoted according to the process in FIG. 1.

Referring to FIG. 2, a schematic diagram of an example network 200 in which WLAN roaming may be promoted is shown. The network 200 includes a first AP (AP1) having a first service area 210, and a neighbouring AP (AP2) having a second service area 220 that overlaps with the first service area 210. For simplicity, two wireless terminals are shown, where both T1 and T2 are currently associated with AP1. T1 is well within the first service area 210, while T2 is within the overlapped area between the first 210 and second 220 service areas.

An AP is generally a network device that provides a wireless terminal access to a network. Wireless terminals T1, T2 may each be any suitable type of computing device that is capable of communicating wirelessly with an AP in the network 200. For example, a wireless terminal may be a laptop computer, personal computer, mobile phone device, tablet computer or personal digital assistant (PDA) etc. A wireless terminal is sometimes referred to a client or station (STA).

Figure 1:
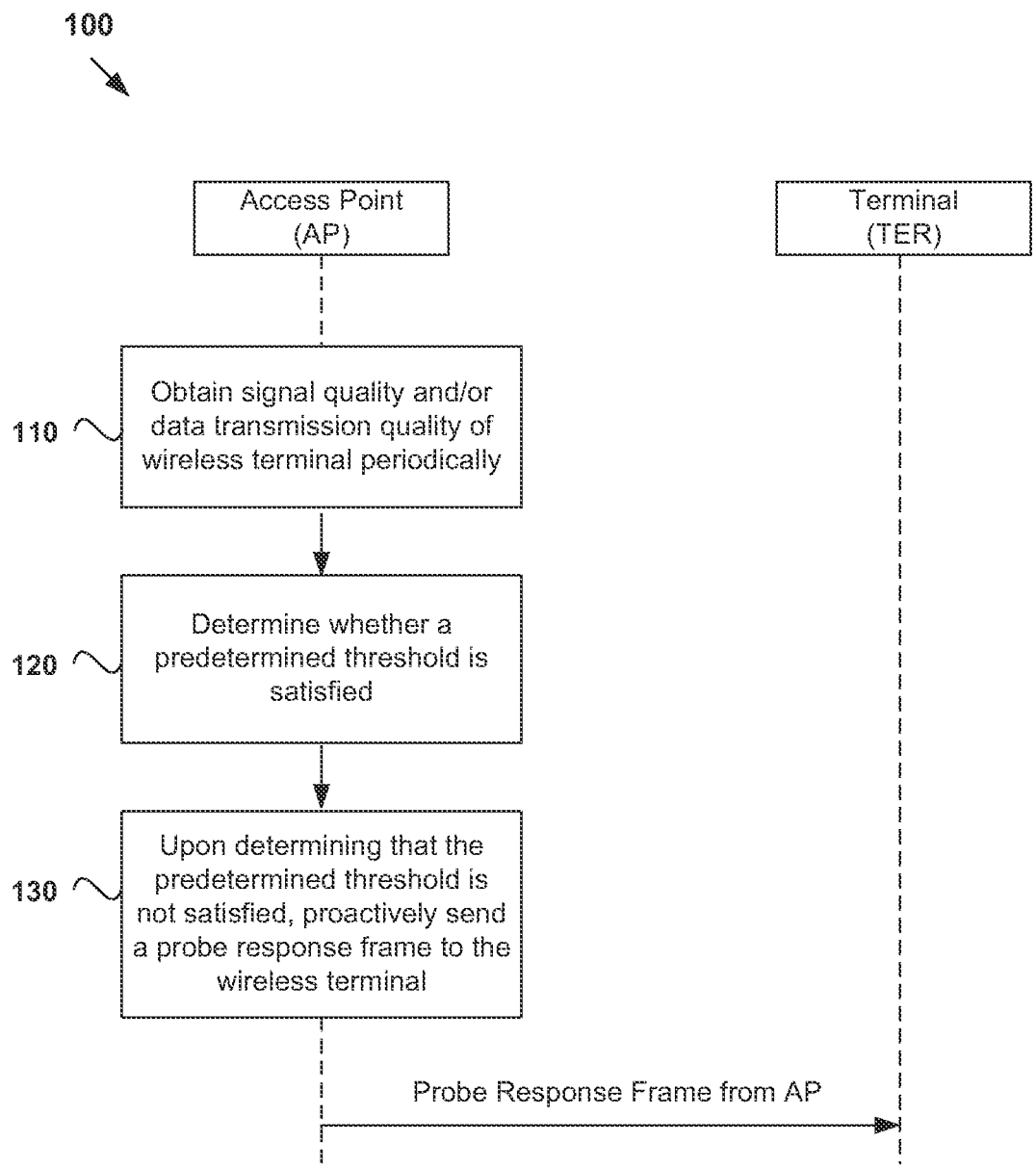
FIG. 1 is a flow diagram of an example process for promoting roaming of a wireless terminal in a WLAN.

According to block 110 in FIG. 1, AP1 obtains signal quality and/or data transmission quality of wireless terminals T1 and T2 periodically. The signal quality may be obtained in any suitable manner, for example based on Received Signal Strength Indicator (RSSI) received by AP1 from T1 and T2 etc. The data transmission quality may be obtained based on statistics or parameters relating to data transmission between AP1 and a wireless terminal, such as packet loss etc. The term "obtaining" is broadly used in the present disclosure to include calculating, deriving, receiving (e.g. from an external device) and/or retrieving (e.g. from a storage device).

According to block 120 in FIG. 1, AP1 compares the obtained signal quality and/or data transmission quality of a wireless terminal with a predetermined threshold. Depending on network requirements, it should be noted that AP1 may obtain either the signal quality or data transmission quality. To further promote roaming of a wireless terminal, both the signal and data transmission quality may be obtained and compared with a respective threshold. To facilitate high quality of wireless access service delivery to the wireless terminal (e.g. anytime and anywhere coverage), the AP may be considered as providing adequate service if both thresholds are satisfied. If one of them is not satisfied, roaming of the wireless terminal is promoted according to block 130.

According to block 130 in FIG. 1, upon determining that the predetermined threshold is not satisfied, AP1 proactively sends a probe response frame to the wireless terminal. The probe response frame notifies the wireless terminal of a wireless signal strength provided by the AP to promote roaming to a neighbouring AP.

Two example scenarios in FIG. 2 are discussed below:
At 230 in FIG. 2, the signal and/or data transmission quality provided to T1 satisfies the predetermined threshold (e.g. above or equal to the threshold). In this case, AP1 continues to provide wireless access services to T1 within its service area 210 as usual. AP1 does not proactively send a probe response frame to T1. Instead, AP1 sends a probe response frame to T1 in response to a probe request frame received from T1. In one example, AP1 responds to the probe request frame the probe response frame at a relatively high power (e.g. maximum power) such that T1 continues to associate with AP1.
At 240 in FIG. 2, the signal and/or data transmission quality provided to T2 does not satisfy the predetermined threshold (e.g. below the threshold). In this case, AP1 considers that its wireless access service is unable to satisfy the requirement of T2, and T2 should or will eventually roam to a neighbouring AP. As such, AP1 proactively (i.e. not in response to a probe request frame received from T2) sends a probe response frame to T2. This enables T2 to quickly sense that the wireless signal strength provided by AP1 is inadequate, therefore inducing it to roam to neighbouring AP2. The probe response frame may be sent at a relatively low power (e.g. minimum power) such that T2 may quickly sense the changed (i.e. reduced) wireless signal strength and then proceed to roam to a neighbouring AP. This reduces the likelihood of T2 being a sticky client of AP1. See also 250 in FIG. 2.

The probe response frame may be proactively sent to the wireless terminal multiple times and/or periodically. For example, AP1 sends five probe response frames to T2 every 2 seconds. This may be repeated until T2 roams to a neighbouring AP or its quality improves.

Roaming Management by Access Controller (AC)

The example described with reference to FIG. 1 and FIG. 2 may be performed by an AP independently. In another example that will be explained with reference to FIG. 3 and FIG. 4, roaming may be managed in a more centralised manner by an AC.

Figure 3:
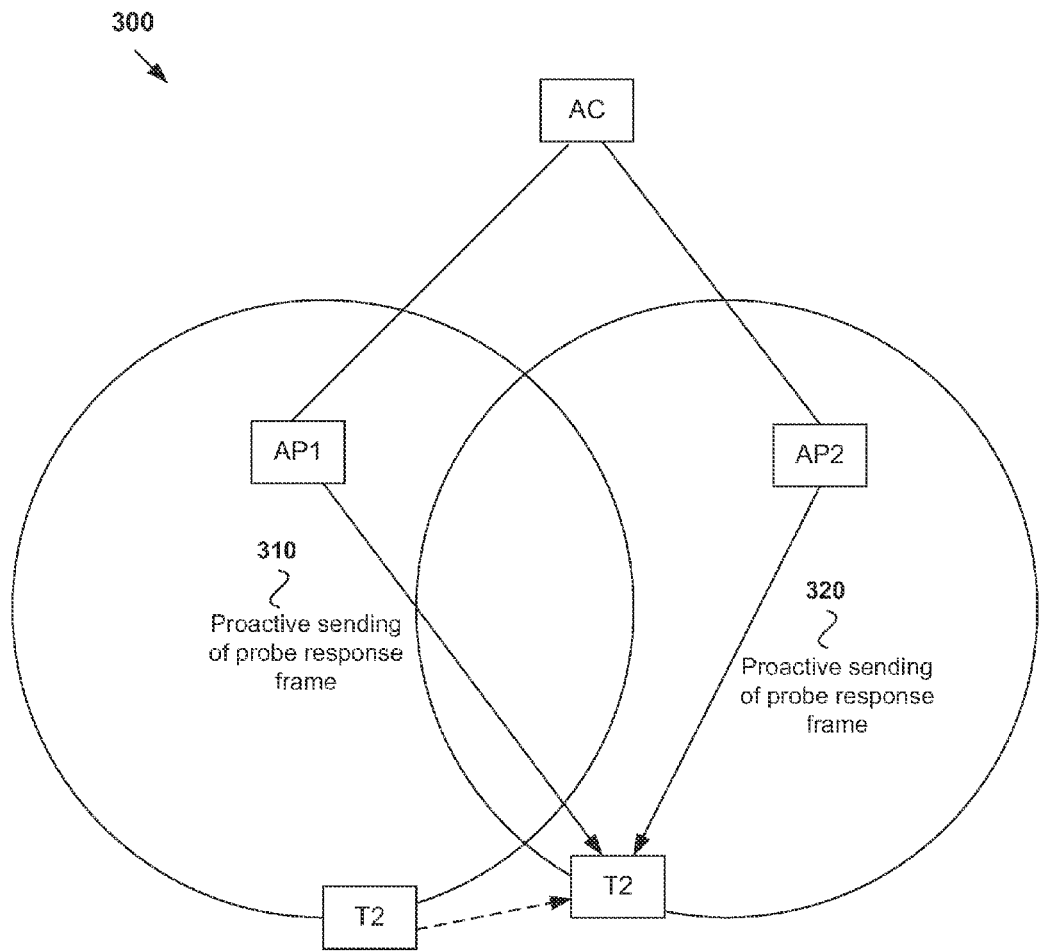
FIG. 3 is a schematic diagram of another example WLAN in which roaming of a wireless terminal is promoted, where the WLAN includes an Access Controller (AC) administering multiple APs.

In the example network 300 in FIG. 3, all APs (e.g. AP1 and AP2, two shown for simplicity) are under the administration of the same AC. Wireless terminals (e.g. T2, one shown for simplicity) move around and in some cases may be better served if they roam from their current AP (e.g. AP1) to a target AP (e.g. AP2). Roaming is induced by the APs (e.g. AP1 and AP2) proactively sending a probe response frame to the terminal (e.g. T2); see 310 and 320 respectively.

Figure 4:
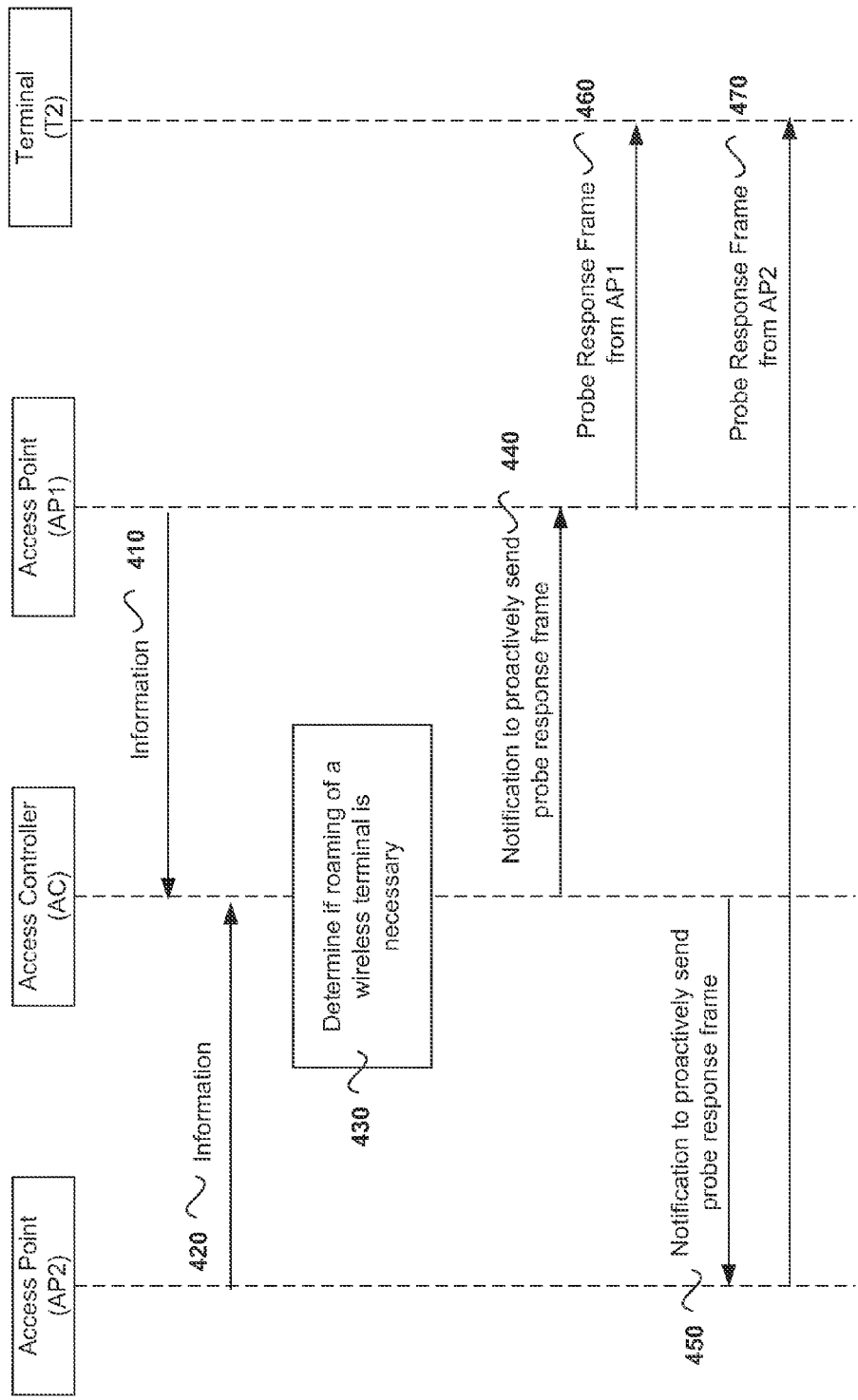
FIG. 4 is a flow diagram of an example process for promoting roaming of a wireless terminal in the example WLAN in FIG. 3.

In particular, referring to the corresponding FIG. 4, roaming may be induced by the APs as follows:
At 410 and 420, all APs (e.g. AP1 and AP2 respectively) collect information relating to a wireless terminal (e.g. T2) and/or channel occupation ratio in real time, and report the information to AC. For example, information relating to the wireless terminal may include whether or not the wireless terminal is associated with the respective AP (e.g. T2 is currently associated with AP1 but not AP2), signal strength and associated Service Set Identifier (SSID), etc. SSIC is generally identified by a WLAN service name provided by a network provider.
At 430, the AC determines whether it is necessary to induce a wireless terminal to roam to another AP based on the information received from the AP1 and AP2.
At 440 and 450, if it is determined that it is necessary to induce roaming, the AC notifies the relevant APs (e.g. AP1 and AP2) to each proactively send a probe response frame to the relevant wireless terminal (e.g. T2).
At 460 and 470, the APs (e.g. AP1 and AP2) proactively send a probe response frame to the relevant wireless terminal (e.g. T2). The current AP (e.g. AP1) may send a probe response frame at a relatively low power, while the target AP (e.g. AP2) may send it at a relatively high power.
As such, T2 may quickly sense a change in the wireless signal strength provided by AP1 and AP2 and roam from AP1 to AP2. The relatively high power of the frame from AP2 enables T2 to assess that it could be better served by AP2, in contrast to the relatively low power of the frame from AP1. The actual power levels used may depend on network settings.

Similar to the example in FIG. 1 and FIG. 2, the probe response frame may be proactively sent to the wireless terminal multiple times and/or periodically. For example, AP1 and AP2 send five probe response frames to T2 every 2 seconds. Of course, the number of times and frequency may vary among different APs.

To further enhance the effect of a probe response frame sent by AP1, a transmission period of beacon frames may be extended. A beacon frame is generally an advertisement frame broadcasted by an AP to inform wireless terminals of the services provided by the AP, and may include information relating to service capability, encryption, service parameters, etc. The beacon frame provides an indication of an AP providing services and represents the service area of the AP, and is usually sent at a constant power to avoid generation of a black hole in the AP's coverage. By extending the transmission period of beacon frames (e.g. from 100 ms to 200 ms), a wireless terminal may rely more on the probe response frame to sense the change in the wireless signal strength of the AP.

Example Network Device 500

Figure 5:
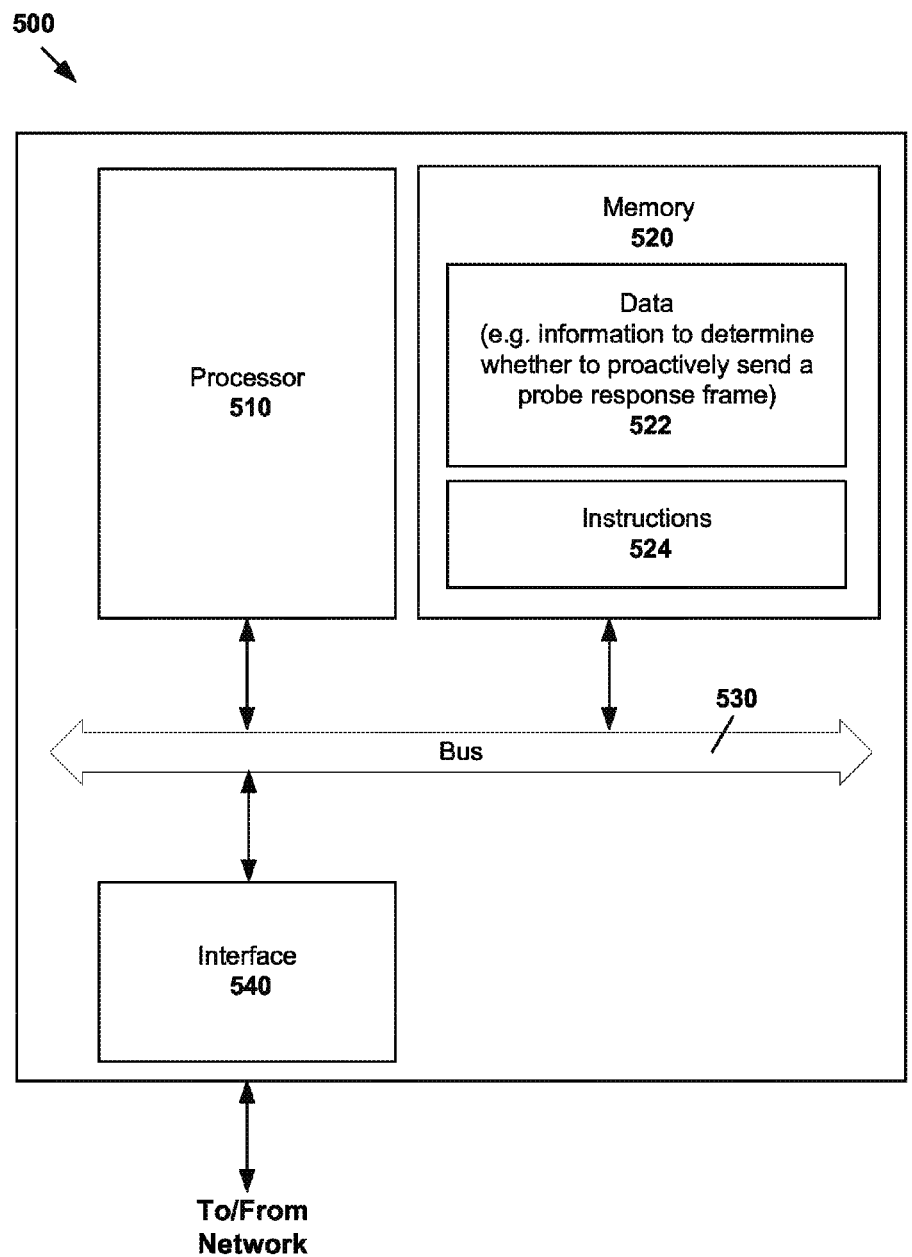
FIG. 5 is a schematic diagram of a first example structure of a network device capable of acting as an AP.

The above examples can be implemented by hardware, software or firmware or a combination thereof. Referring to FIG. 5, an example apparatus or network device 500 capable of acting as an AP for promoting roaming in a WLAN.

The example network device 500 includes processor 510, non-volatile memory 520 and interface 540 that communicate with each other via bus 530. The processor 510 is to perform the relevant processes described herein with reference to FIG. 1 to FIG. 4. The memory 520 may also store machine-readable instructions 524 executable by the processor 510 to cause the processor 510 to perform processes described herein with reference to FIG. 1 to FIG. 4. The interface 540 is to communicate with a wireless terminal. In one example, the processor 510 is to execute instructions to perform the following (see also FIG. 1 and FIG. 2):

- Obtain signal quality and/or data transmission quality of the wireless terminal periodically.
- Determine whether the obtained signal quality and/or data transmission quality of the wireless terminal satisfies a predetermined threshold.
- Upon determining that the predetermined threshold is not satisfied, proactively send a probe response frame to the wireless terminal. The probe response frame is proactively sent to promote roaming to a neighbouring AP, for example by influencing wireless signal strength sensing at the wireless terminal.

The memory 520 may store any necessary data 522 for promoting roaming in a WLAN, including but not limited to signal and/or data transmission quality of a wireless terminal to determine whether it is necessary to proactively send a probe response frame to the wireless terminal. In one example, the instructions 524 (not shown in FIG. 5 for simplicity) stored in memory 520 may include:

- Instructions to obtain signal quality and/or data transmission quality of the wireless terminal periodically.
- Instructions to determine whether the obtained signal quality and/or data transmission quality of the wireless terminal satisfies a predetermined threshold.
- Instructions to, upon determining that the predetermined threshold is not satisfied, proactively send a probe response frame to the wireless terminal. The probe response frame is proactively sent to promote roaming to a neighbouring AP, for example by influencing wireless signal strength sensing at the wireless terminal.

Figure 6:
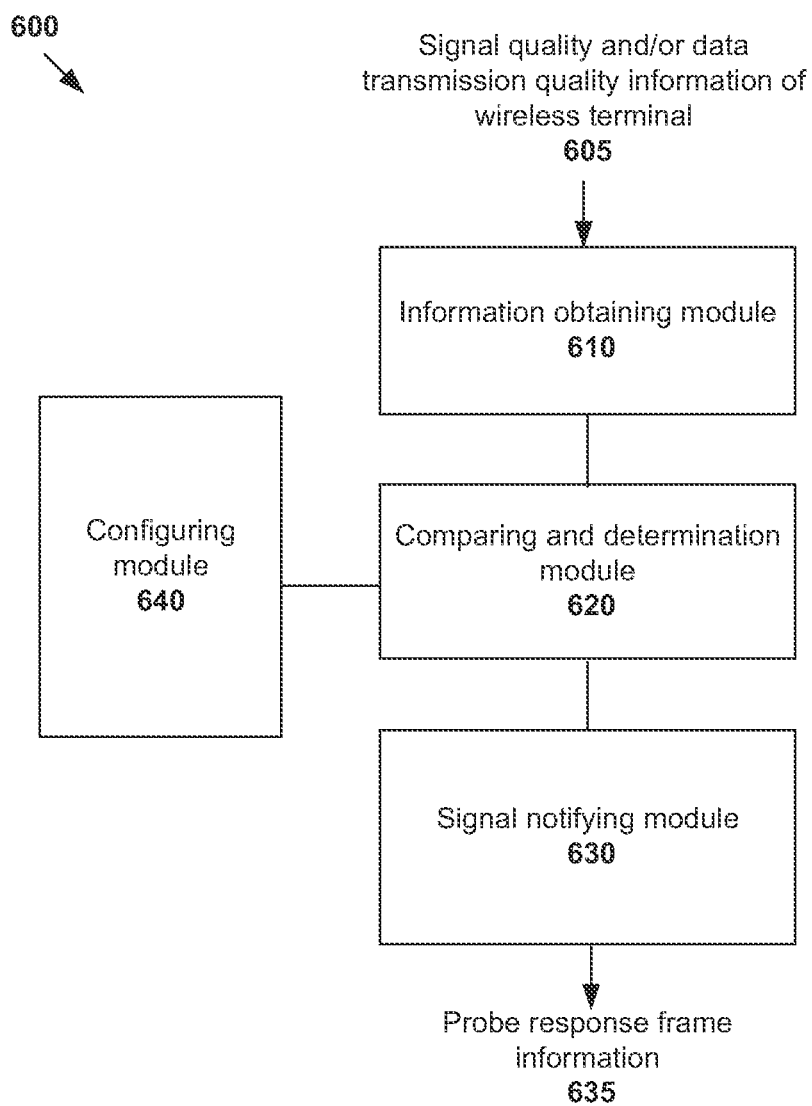
FIG. 6 is a schematic diagram of a second example structure of a network device capable of acting as an AP.

Alternatively or additionally the example network device 500 may include the modules (which may be software, hardware or a combination of both) to perform the processes described herein with reference to FIG. 1 to FIG. 4. Referring to the example in FIG. 6, the network device capable of acting as an AP may include the following modules:

- Module (e.g. information obtaining module 610) to obtain signal quality and/or data transmission quality information of the wireless terminal 605 periodically.
- Module (e.g. comparing and determining module 620) to compare the obtained signal quality and/or data transmission quality of the wireless terminal with a predetermined threshold and making a determination as to whether the predetermined threshold is satisfied.
- Module (e.g. signal notifying module 630) to proactively send a message to notify the wireless terminal of a wireless signal strength of the AP if the predetermined threshold is not satisfied. The message (e.g. in the form of probe response frame information 635) is proactively sent to promote roaming to a neighbouring AP, for example by influencing wireless signal strength sensing at the wireless terminal.
- Module (e.g. configuring module 640) to pre-configure the predetermined threshold, and/or a period of beacon frames sent by the network device.

Although not repeated here, it should be understood that the processor 510 in network device 500 may further include instructions and/or modules to implement the relevant processes described herein with reference to FIG. 1 to FIG. 4.

The methods, processes, modules and units described herein may be implemented by hardware (including hardware logic circuitry), software or firmware or a combination thereof. The term "processor" is to be interpreted broadly to include a processing unit, ASIC, logic unit, or programmable gate array etc. The processes, methods, modules and units may all be performed by the one or more processors 510; reference in this disclosure or the claims to a "processor" should thus be interpreted to mean 'one or more processors'.

Although one network interface 540 is shown in FIG. 5, processes performed by the network interface 540 may be split among multiple network interfaces (not shown for simplicity). As such, reference in this disclosure to a "network interface" should be interpreted to mean "one or more network interfaces".

Further, the processes, methods, modules and units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the modules or units shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or unit, or further divided into a plurality of sub-modules or sub-units respectively.

Although the flow diagrams described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for promoting roaming of a wireless terminal in a wireless local area network (WLAN), the method comprising:

an access point (AP) obtaining signal quality and/or data transmission quality of the wireless terminal periodically;

the AP collecting information of the wireless terminal and information of occupation rate of a current channel;

the AP determining whether the obtained signal quality and/or data transmission quality of the wireless terminal satisfies a predetermined threshold;

the AP reporting the collected information to an access controller (AC) that administers the AP, wherein the collected information is used by the AC to determine whether or not it is necessary for the wireless terminal to roam to a neighbouring AP; and in response to i) determining that the predetermined threshold is not satisfied, or ii) receiving a notification from the AC to proactively send a probe response frame to the wireless terminal, the AP proactively sending a probe response frame to the wireless terminal, wherein the probe response frame notifies the wireless terminal of a wireless signal strength provided by the AP to promote roaming to the neighbouring AP.

2. The method of claim 1, further comprising:
in response to determining that the predetermined threshold is satisfied, i) the AP is to not proactively send the probe response frame, or ii) sending the probe response frame to the wireless terminal at a power level higher than an initial power in response to a probe request frame previously received from the wireless terminal.

3. The method of claim 1, wherein the probe response frame is proactively sent at a power level lower than an initial power to influence sensing by the wireless terminal that the wireless signal strength of the AP is unable to satisfy a service requirement and to roam to the neighbouring AP.

4. The method of claim 1, further comprising the AP proactively sending the probe response frame to the wireless terminal after receiving the notification from the AC.

5. The method of claim 1, wherein:
the AP obtains the signal quality of the wireless terminal based on received signal strength indication (RSSI) information received from the wireless terminal periodically; or
the AP obtains the data transmission quality of the wireless terminal based on statistics of data transmission between the AP and the wireless terminal.

6. The method of claim 1, further comprising the AP extending a period of beacon frames sent by the AP to the wireless terminal to enhance an effect of the probe response frame on promoting roaming.

7. The method of claim 1, wherein the probe response frame is proactively sent by the AP periodically and multiple times to the wireless terminal.

8. An access point network device for promoting roaming of a wireless terminal in a wireless local area network (WLAN), the network device comprising memory to store executable instructions, an interface to communicate with the wireless terminal, and a processor to:

obtain signal quality and/or data transmission quality of the wireless terminal periodically;

collect information of the wireless terminal and information of occupation rate of a current channel;

determine whether the obtained signal quality and/or data transmission quality of the wireless terminal satisfies a predetermined threshold;

report the collected information to an access controller (AC) that administers the AP, wherein the collected information is used by the AC to determine whether or not it is necessary for the wireless terminal to roam to a neighbouring AP; and in response to i) determining that the predetermined threshold is not satisfied, or ii) receiving a notification from the AC to proactively send the probe response frame to the wireless terminal, proactively send a probe response frame to the wireless terminal, wherein the probe response frame is proactively sent to notify the wireless terminal of a wireless signal strength provided by the AP to influence wireless signal strength sensing at the wireless terminal and promote roaming to a neighbouring AP.

9. The network device of claim 8, wherein:
in response to determining that the predetermined threshold is satisfied, i) the AP is to not proactively send the probe response frame, or ii) sending the probe response frame to the wireless terminal at a power level higher than an initial power in response to a probe request frame previously received from the wireless terminal.

10. The network device of claim 8, wherein the processor is to proactively send the probe response frame at a power level lower than an initial power to influence sensing by the wireless terminal that the wireless signal strength of the AP is unable to satisfy a service requirement and to roam to the neighbouring AP.

11. The network device of claim 8, wherein the processor is further to:
proactively send the probe response frame to the wireless terminal after receiving the notification from the AC.

12. The network device of claim 8, wherein the processor is to:
obtain the signal quality of the wireless terminal based on received signal strength indication (RSSI) information received from the wireless terminal periodically; or
obtain the data transmission quality of the wireless terminal based on statistics of data transmission between the AP and the wireless terminal.

13. The network device of claim 8, wherein the processor is to extend a period of beacon frames sent by the AP to the wireless terminal to enhance an effect of the probe response frame on promoting roaming.

14. The network device of claim 8, wherein the processor is to proactively send the probe response frame periodically and multiple times.

* * * * *